US011370419B2

(12) United States Patent
Schwindt et al.

(10) Patent No.: US 11,370,419 B2
(45) Date of Patent: Jun. 28, 2022

(54) USE OF DRIVER ASSISTANCE COLLISION MITIGATION SYSTEMS WITH AUTONOMOUS DRIVING SYSTEMS

(71) Applicant: Robert Bosch GmbH, Stuttgart (DE)

(72) Inventors: Oliver F. Schwindt, Sunnyvale, CA (US); Thomas B. Gussner, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 210 days.

(21) Appl. No.: 16/682,546

(22) Filed: Nov. 13, 2019

(65) Prior Publication Data

US 2021/0139018 A1 May 13, 2021

(51) Int. Cl.
*B60W 30/09* (2012.01)
*B60W 10/18* (2012.01)
*B60W 10/20* (2006.01)
*B60W 50/00* (2006.01)
*H04L 67/12* (2022.01)
*H04L 12/40* (2006.01)

(52) U.S. Cl.
CPC ............ *B60W 30/09* (2013.01); *B60W 10/18* (2013.01); *B60W 10/20* (2013.01); *B60W 50/00* (2013.01); *H04L 67/12* (2013.01); *B60W 2050/0028* (2013.01); *B60W 2554/00* (2020.02); *B60W 2710/18* (2013.01); *B60W 2710/20* (2013.01); *H04L 12/40013* (2013.01)

(58) Field of Classification Search
CPC .................................................... B60W 30/09
See application file for complete search history.

(56) References Cited

U.S. PATENT DOCUMENTS

| | | | |
|---|---|---|---|
| 6,604,042 B2 | 8/2003 | Maruko et al. | |
| 8,126,626 B2 | 2/2012 | Zagorski | |
| 8,868,311 B2* | 10/2014 | Schwindt | B60T 7/22 |
| | | | 701/93 |
| 9,682,689 B2* | 6/2017 | Parker | B60T 8/171 |
| 9,988,046 B2 | 6/2018 | Trombley et al. | |
| 10,345,814 B2* | 7/2019 | Keller | B60T 7/22 |
| 10,625,742 B2* | 4/2020 | D'sa | B60W 50/045 |
| 2016/0193999 A1 | 7/2016 | Sasabuchi | |
| 2018/0370528 A1 | 12/2018 | Rittger et al. | |

(Continued)

*Primary Examiner* — Michael A Berns
(74) *Attorney, Agent, or Firm* — Michael Best & Friedrich LLP

(57) ABSTRACT

Systems and methods for controlling a vehicle. The system includes one or more sensors positioned on the vehicle and configured to sense an environment surrounding the vehicle, a collision mitigation subsystem configured to control a braking system of the vehicle, and an autonomous driving subsystem communicatively coupled to the one or more sensors and the collision mitigation subsystem. The autonomous driving subsystem is configured to receive sensor information from the one or more sensors and generate, based on the sensor information, a model of the environment surrounding the vehicle. The autonomous driving subsystem is configured to determine, based on the model of the environment surrounding the vehicle, a plurality of possible trajectories for the vehicle and to select, from the plurality of possible trajectories, a travel path for the vehicle. The autonomous driving subsystem is configured to transmit the travel path to the collision mitigation subsystem.

20 Claims, 4 Drawing Sheets

(56) References Cited

U.S. PATENT DOCUMENTS

| | | | | |
|---|---|---|---|---|
| 2020/0364579 A1* | 11/2020 | Misu | ................... | G06N 3/0454 |
| 2021/0139018 A1* | 5/2021 | Schwindt | .............. | B60W 30/09 |
| 2021/0163021 A1* | 6/2021 | Frazzoli | ................. | H04W 4/00 |

* cited by examiner

USE OF DRIVER ASSISTANCE COLLISION MITIGATION SYSTEMS WITH AUTONOMOUS DRIVING SYSTEMS

BACKGROUND OF THE INVENTION

Modern vehicles, including those capable of autonomous driving, include partially autonomous driver assistance systems, for example, lane keeping assistance, adaptive cruise-control, collision mitigation, self-parking, and the like. Driver assistance systems use sensor inputs and driver inputs to determine when to adjust steering, acceleration, braking, and other vehicle characteristics. For example, collision mitigation systems use sensor inputs to detect objects and driver inputs to predict a likely vehicle trajectory in order to detect and mitigate imminent collisions. Autonomous driving systems process sensor information to automatically determine a trajectory, and control the vehicle's steering, braking, and other systems to cause the vehicle to follow the trajectory.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
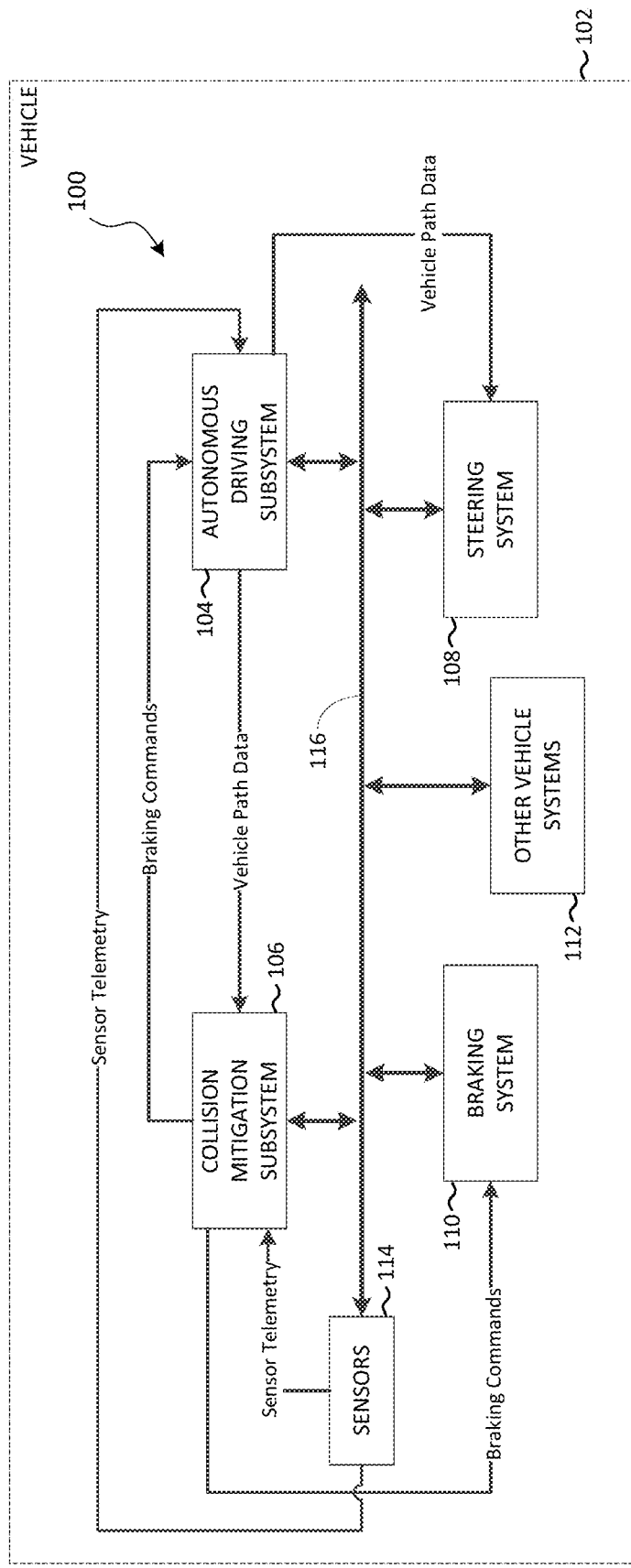
FIG. 1 is a block diagram of a vehicle control system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Collision mitigation systems are widely available in modern vehicles that include partially and fully autonomous driving systems. Sensors, for example, radars, cameras, lidars, and the like, are mounted to vehicles. Collision mitigation systems use sensor inputs detect objects in the environment surround the vehicle. Collision mitigation systems use sensor and driver inputs (for example, to a steering system) to interpret driver intentions (that is, the predicted vehicle trajectory). When a collision mitigation system detects an imminent collision, it takes steps to avoid the collision (for example, preloading the breaking system, applying emergency braking force, providing a collision warning, performing evasive steering, and the like). However, accurately predicting driver intention, and thus the vehicle's trajectory, can prove difficult. Collision mitigation systems perform better in unambiguous conditions, for example, when approaching another vehicle or non-vehicle object in a straight line or on a constant curve. However, in some instances, correctly interpreting what a driver intends to do (that is, the predicted vehicle trajectory) is more difficult. For example, when the vehicle is driving in a straight line toward an object, and the driver intends to steer around it shortly before the collision. In such cases, forward collision warnings and/or emergency braking commands may be incorrectly issued. During intense steering maneuvers, the likelihood that the system predicts that the vehicle trajectory points toward an unintended object is increased. This may result in a large number of false positives. As a result, some collision mitigation systems are generally tuned to not react, or to react later when such driver inputs are detected. Furthermore, the situational ambiguity regarding driver intent increases quadratically with increasing speed relative to the possible collision object, exacerbating the problem for higher vehicle operating speeds.

Autonomous driving systems are being developed, which may include collision mitigation functions. However, the amount of data required from each individual sensor is much higher in autonomous driving systems than for driver assistance systems. There are also many more sensors that are needed for an autonomous driving system. This leads to large amounts of information that may take longer to process. As a result there may be increased latency between a sensor measuring data and the vehicle actuation reacting based on that data. This may lead to a higher latency in developing and implementing reactions to a suddenly appearing situation than is present in driver assistance systems. Furthermore, attempts to simply operate a collision mitigation system in parallel with automated driving system fails to provide lower latency reactions or would have too many false positives. Both systems are making independent decisions, and the collision mitigation system is attempting to determine the intent of another automated system. Furthermore, current systems are tuned to observe human driver inputs, especially interpreting if they are paying attention. Accordingly, systems and methods are provided herein for, among other things, utilizing driver assistance collision mitigation systems in conjunction with autonomous driving systems.

Embodiments provided herein use lower latency driver assistance systems to provide collision mitigation for autonomous driving systems. The independent collision mitigation system still exists apart from the autonomous driving system. This independent path may have been developed and tested completely independently (thereby reducing common cause possibilities). In some cases, the systems and their sensors are provided by different suppliers. Rather than operating such systems in parallel and apart from one another, embodiments presented herein operate the two systems in concert to provide reduced reaction latency and add redundancy to the vehicle's operations.

While in an autonomous driving mode, the vehicle's autonomous driving system determines and sends trajectory information to vehicle system actuators and the collision mitigation system. The vehicle's future positions, velocities, accelerations, and yaw rates are precisely known, because the vehicle's autonomous driving system has already determined them. Rather than attempting to predict driver intent, the collision mitigation system can operate using precise knowledge of the (autonomous) driver's intent. By removing the uncertainty about the driver's intended path for the vehicle, a significant cause of false positives and false negatives in the driver assistance system is eliminated. As a result, the collision mitigation system operates with less ambiguity. As a result, existing solutions intended for a human driver's use can be re-tuned to be more effective, because the situational ambiguity is no longer present, and the tuning will only need to address sensor performance (that is, mitigating the effects of noise and other sensor specific sources of false positives).

Embodiments presented herein also provide information on mitigation measures from the collision mitigation system to the autonomous driving system. This allows the autonomous driving system to use, for example, emergency braking signal data during trajectory planning. The autonomous driving system needs to know that the longitudinal part of its last trajectory command has been overridden because the next planning cycle considers this to maintain consistency.

One example embodiment provides a system for controlling a vehicle. The system includes one or more sensors positioned on the vehicle and configured to sense an environment surrounding the vehicle, a collision mitigation subsystem configured to control a braking system of the vehicle, and an autonomous driving subsystem communicatively coupled to the one or more sensors and the collision mitigation subsystem. The autonomous driving subsystem is configured to receive sensor information from the one or more sensors. The autonomous driving subsystem is configured to generate, based on the sensor information, a model of the environment surrounding the vehicle. The autonomous driving subsystem is configured to determine, based on the model of the environment surrounding the vehicle, a plurality of possible trajectories for the vehicle. The autonomous driving subsystem is configured to select, from the plurality of possible trajectories, a travel path for the vehicle. The autonomous driving subsystem is configured to transmit the travel path to the collision mitigation subsystem.

Another example embodiment provides a method for controlling a vehicle. The method includes receiving sensor information from one or more sensors positioned on the vehicle and configured to sense an environment surrounding the vehicle. The method includes generating, with an autonomous driving subsystem communicatively coupled to the one or more sensors and based on the sensor information, a model of the environment surrounding the vehicle. The method includes determining, with the autonomous driving subsystem and based on the model of the environment surrounding the vehicle, a plurality of possible trajectories for the vehicle. The method includes selecting, from the plurality of possible trajectories, a travel path for the vehicle. The method includes transmitting the travel path to the collision mitigation subsystem configured to control a braking system of the vehicle.

Another example embodiment provides a vehicle. The vehicle includes one or more sensors positioned on the vehicle and configured to sense an environment surrounding the vehicle. The vehicle includes a collision mitigation subsystem. The vehicle includes an autonomous driving subsystem communicatively coupled to the one or more sensors and the collision mitigation subsystem. The autonomous driving subsystem is configured to receive sensor information from the one or more sensors. The autonomous driving subsystem is configured to generate, based on the sensor information, a model of the environment surrounding the vehicle. The autonomous driving subsystem is configured to determine, based on the model of the environment surrounding the vehicle, a plurality of possible trajectories for the vehicle. The autonomous driving subsystem is configured to select, from the plurality of possible trajectories, a travel path for the vehicle. The autonomous driving subsystem is configured to transmit the travel path to the collision mitigation subsystem. The collision mitigation subsystem is configured to receive the sensor information from the one or more sensors. The collision mitigation subsystem is configured to detect, based on the sensor information, at least one object in the environment surrounding the vehicle. The collision mitigation subsystem is configured to receive the travel path from the autonomous driving subsystem. The collision mitigation subsystem is configured to determine, based on a characteristic of the at least one object and the travel path, a likely collision between the vehicle and the object. The collision mitigation subsystem is configured to in response to determining the likely collision, transmit, to a braking system of the vehicle, a mitigation command based on the likely collision. The collision mitigation subsystem is configured to transmit, to the autonomous driving subsystem, the mitigation command.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized to implement the invention. It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (for example, a system bus) connecting the components.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a block diagram of one exemplary embodiment of an autonomous vehicle control system 100. As described more particularly below, the autonomous vehicle control system 100 may be mounted on, or integrated into, a vehicle 102 and autonomously drives the vehicle. It should be noted that, in the description that follows, the terms "autonomous vehicle" and "automated vehicle" should not be considered limiting. The terms are used in a general way to refer to an autonomous or automated driving vehicle, which possesses varying degrees of automation (that is, the vehicle is configured to drive itself with limited, or in some cases no, input from a driver). The systems and methods described herein may be used with any vehicle capable of operating partially or fully autonomously, being controlled manually by a driver, or some combination of both.

The term "driver," as used herein, generally refers to an occupant of an autonomous vehicle who is seated in the driver's position, operates the controls of the vehicle while in a manual mode, or provides control input to the vehicle to influence the autonomous operation of the vehicle. The term "passenger," as used herein, generally refers to an occupant of an autonomous vehicle who passively rides in the vehicle without controlling the driving operations of the vehicle. However, both the driver and passenger of an autonomous vehicle may share some of the other's role. For example, the driver may hand over the driving controls to the autonomous vehicle control system 10 and ride in the vehicle as a passenger for some or all of a trip.

In the example illustrated, the system 100 includes an autonomous driving subsystem 104, a collision mitigation subsystem 106, a steering system 108, a braking system 110, other vehicle systems 112, and sensors 114. The components of the system 100, along with other various modules and components are electrically coupled to each other by or through one or more control or data buses (for example, the bus 116), which enable communication therebetween. The use of control and data buses for the interconnection between, and communication among, the various modules and components would be known to a person skilled in the art in view of the invention described herein. In some embodiments, the bus 116 is a Controller Area Network (CAN™) bus. In some embodiments, the bus 116 is an automotive Ethernet™, a FlexRay™ communications bus, or another suitable wired bus. In alternative embodiments, some or all of the components of the system 100 may be communicatively coupled using suitable wireless modalities (for example, Bluetooth™ or near field communication).

For ease of description, the system 100 illustrated in FIG. 1 includes one of each of the foregoing components. Alternative embodiments may include one or more of each component, or may exclude or combine some components. The autonomous driving subsystem 104 and the collision mitigation subsystem 106 (each described more particularly below with respect to FIG. 2) operate the steering system 108, the braking system 110, other vehicle systems 112, and the sensors 114 to autonomously control the vehicle according to the methods described herein.

The autonomous driving subsystem 104 receives sensor telemetry from the sensors 114 (and, in some cases, braking commands from the collision mitigation subsystem 106) and determines path data for the vehicle (for example, vehicle trajectories). The autonomous driving subsystem 104 transmits vehicle path data to, among other things, the vehicle steering system 108 to control the path of the vehicle (for example, by generating braking signals, acceleration signals, steering signals). The autonomous driving subsystem 104 also transmits vehicle path data to the collision mitigation subsystem 106.

The collision mitigation subsystem 106 uses the vehicle path data and sensor telemetry received from the sensors 114 to detect and mitigate imminent collisions between the vehicle 102 and objects in the environment surround the vehicle 102. For example, the collision mitigation subsystem 106 may issue braking commands to the braking system 110 to slow or stop the vehicle. The braking commands (and other mitigation action data) issued to mitigate an imminent collision are also transmitted to the autonomous driving subsystem 104, which, as noted, may plan vehicle trajectories talking into account the braking commands.

The sensors 114 determine one or more attributes of the vehicle and its surrounding environment and communicate information regarding those attributes to the other components of the system 100 using, for example, electrical signals. The vehicle attributes include, for example, the position of the vehicle or portions or components of the vehicle, the movement of the vehicle or portions or components of the vehicle, the forces acting on the vehicle or portions or components of the vehicle, the proximity of the vehicle to other vehicles or objects (stationary or moving), yaw rate, sideslip angle, steering wheel angle, superposition angle, vehicle speed, longitudinal acceleration, and lateral acceleration, and the like. The sensors 114 may include, for example, vehicle control sensors (for example, sensors that detect accelerator pedal position, brake pedal position, and steering wheel position [steering angle]), wheel speed sensors, vehicle speed sensors, yaw sensors, force sensors, odometry sensors, and vehicle proximity sensors (for example, camera, radar, LIDAR, and ultrasonic). In some embodiments, the sensors 114 include one or more cameras configured to capture one or more images of the environment surrounding the vehicle 102 according to their respective fields of view. The cameras may include multiple types of imaging devices/sensors, each of which may be located at different positions on the interior or exterior of the vehicle 102. In some embodiments, the system 100 includes, in addition to the sensors 114, a GNSS (global navigation satellite system) system that determines geo-spatial positioning (i.e., latitude, longitude, altitude, and speed) for the vehicle based on received satellite radiofrequency signals. The autonomous driving subsystem 104 may use this information in conjunction with information received from the sensors 114 when controlling vehicle 102.

The autonomous driving subsystem 104 and the collision mitigation subsystem 106 receive and interpret the signals from the sensors to determine values for one or more vehicle attributes, including, for example, vehicle speed, steering angle, vehicle position, pitch, yaw, and roll. The autonomous driving subsystem 104 and the collision mitigation subsystem 106 also receive and interpret the signals from the sensors to determine attributes of the environment surround the vehicle 102 (for example, road markings, traffic signals, traffic signs, and the presence, location, trajectories of objects potentially in the environment surrounding the vehicle 102). In some embodiments, the autonomous driving subsystem 104, the collision mitigation subsystem 106, or both, include object detection software, which uses machine learning techniques to detect (for example, from images received from a camera), objects that may impact the movement of the vehicle 102. For example, the object detection software may include a convolutional neural network that has been trained to recognize vehicles, people, animals, a combination of the foregoing, and the like.

The steering system 108 is configured to direct the vehicle 102 by moving steering components connected to a front axle of the vehicle 102 based on a steering command (for example, a movement of a steering wheel or a command from the autonomous driving subsystem 104 or the collision mitigation subsystem 106). The steering system 108 may also include a steering wheel, servo motors, actuators, and the like.

The braking system 110 is a braking system that utilizes a frictional braking force to inhibit the motion of one or more of the wheels of the vehicle 102 in order to slow and/or stop the vehicle 102. For example, some or all of the wheels are fitted with brake pads which apply a frictional braking force that inhibits the motion of rotors connected to the wheels. In some embodiments, the braking system 110 is a conventional hydraulic braking system. The braking system 110 may include a brake booster configured to increase the force a brake pad exerts on the wheels of the vehicle 102. In some embodiments, the braking system 110 includes a regenerative braking system. The regenerative braking system, during a braking maneuver, causes an electric motor to act as a generator and stores or redistributes the power generated by the motor. The act of generating power creates a braking torque on the motor that is transmitted to one or more of the wheels that the motor is coupled to in order to slow and/or stabilize the vehicle 102.

The other vehicle systems 112 include controllers, sensors, actuators, and the like for controlling aspects of the operation of the vehicle 102 (for example, steering, acceleration, braking, shifting gears, and the like). The other vehicle systems 112 are configured to send and receive data relating to the operation of the vehicle 102 to and from the autonomous driving subsystem 104 or the collision mitigation subsystem 106.

Figure 2:
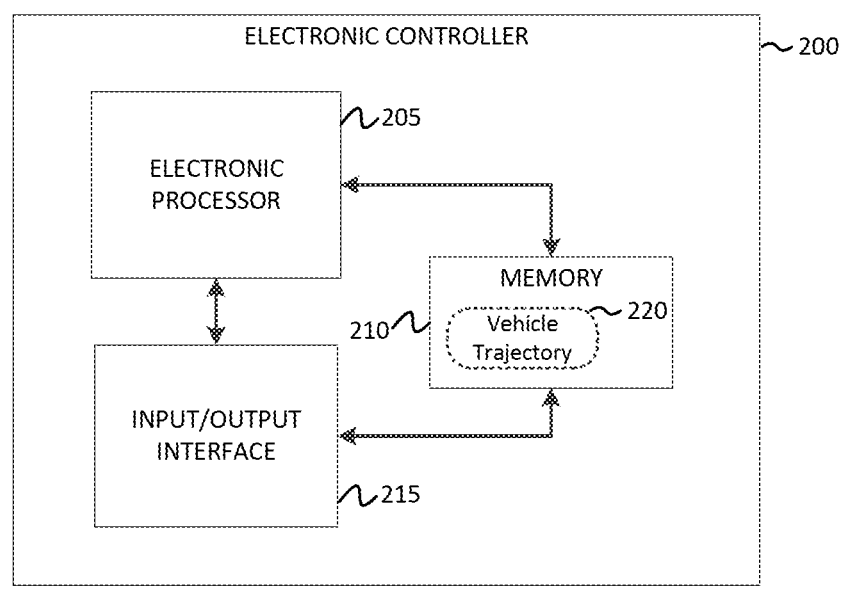
FIG. 2 schematically illustrates an electronic controller of the system of FIG. 1, in accordance with some embodiments.

Each of the autonomous driving subsystem 104 and the collision mitigation subsystem 106 may be implemented with or include an electronic controller. FIG. 2 illustrates an exemplary embodiment of an electronic controller 200, which includes an electronic processor 205 (for example, a microprocessor, application specific integrated circuit, etc.), a memory 210, and an input/output interface 215. The memory 210 may be made up of one or more non-transitory computer-readable media, and includes at least a program storage area and a data storage area. The program storage area and the data storage area can include combinations of different types of memory, such as read-only memory ("ROM"), random access memory ("RAM") (for example, dynamic RAM ("DRAM"), synchronous DRAM ("SDRAM"), etc.), electrically erasable programmable read-only memory ("EEPROM"), flash memory, or other suitable memory devices. The electronic processor 205 is coupled to the memory 210 and the input/output interface 28. The electronic processor 205 sends and receives information (for example, from the memory 210 and/or the input/output interface 215), and processes the information by executing one or more software instructions or modules, capable of being stored in the memory 210, or another non-transitory computer readable medium. The software can include firmware, one or more applications, program data, filters, rules, one or more program modules, and other executable instructions. The electronic processor 205 is configured to retrieve from the memory 210 and execute, among other things, software for autonomous vehicle control, and for performing methods as described herein. In the embodiment illustrated, the memory 210 stores, among other things, vehicle trajectory information 220.

The input/output interface 215 transmits and receives information from devices external to the electronic controller 200 (for example, over one or more wired and/or wireless connections), for example, components of the system 100 via the bus 116. The input/output interface 215 receives user input, provides system output, or a combination of both. As described herein, user input from a driver or passenger of a vehicle may be provided via, for example, the steering system 108. The input/output interface 215 may also include other input and output mechanisms, which for brevity are not described herein and which may be implemented in hardware, software, or a combination of both.

It should be understood that although FIG. 2 illustrates only a single electronic processor 205, memory 210, and input/output interface 215, alternative embodiments of the electronic controller 12 may include multiple processing units, memory modules, and/or input/output interfaces. It should also be noted that the system 100 may include other electronic controllers, each including similar components as, and configured similarly to, the electronic controller 200. In some embodiments, the electronic controller 200 is implemented partially or entirely on a semiconductor (for example, a field-programmable gate array ["FPGA"] semiconductor) chip. Similarly, the various modules and controllers described herein may be implemented as individual controllers, as illustrated, or as components of a single controller. In some embodiments, a combination of approaches may be used.

In some embodiments, autonomous driving subsystem 104 and the collision mitigation subsystem 106 may be implemented on a single electronic controller (for example, with one or more electronic processors and a shared memory).

Figure 3:
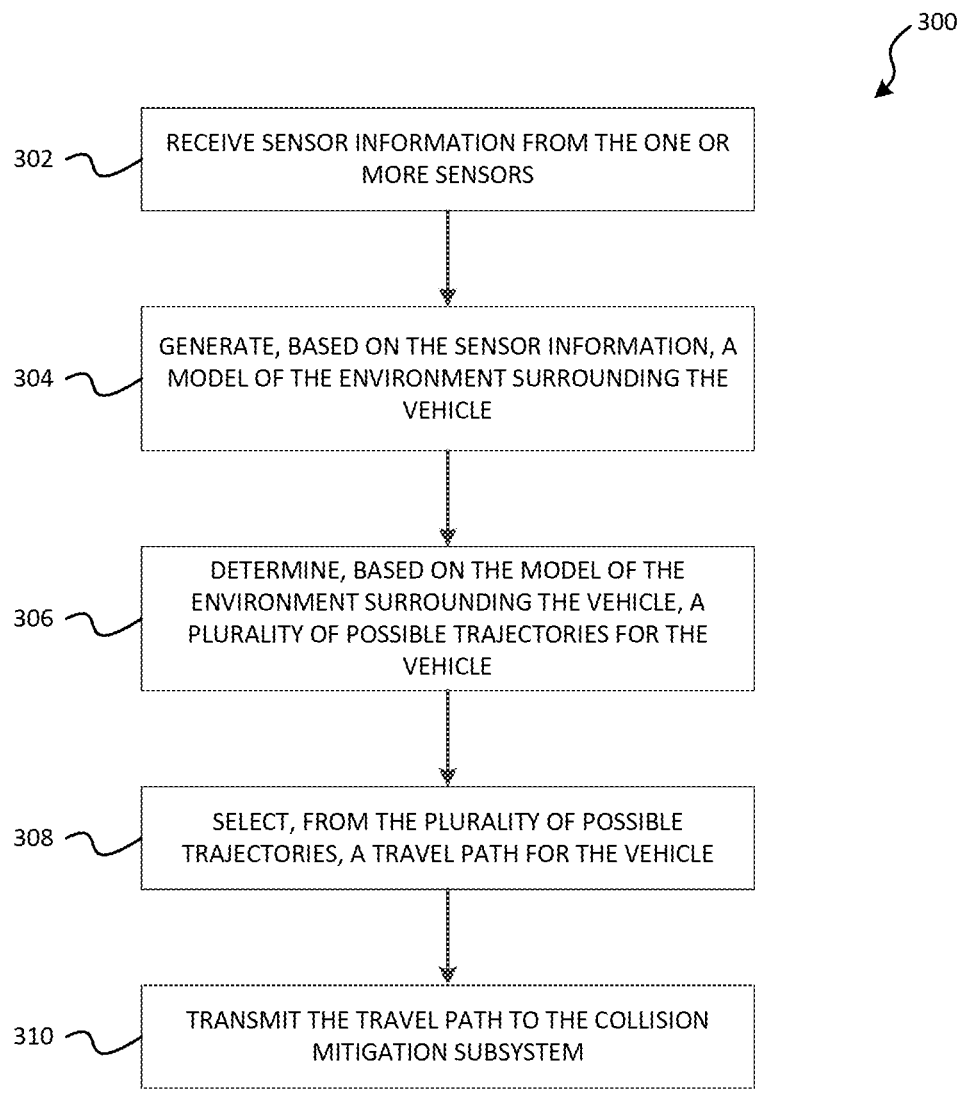
FIG. 3 is a flow chart of a method performed by the system of FIG. 1 to control a vehicle, in accordance with some embodiments.

As noted, situational ambiguities may prevent a collision mitigation system from accurately determining driver intentions, resulting in false positives. FIG. 3 illustrates an example method 300 for controlling a vehicle by operating a collision mitigation system in concert with an autonomous driving system to provide reduced reaction latency and increased redundancy to the vehicle's operation. Although the method 300 is described in conjunction with the system 100 as described herein, the method 300 could be used with other systems and vehicles. In addition, the method 300 may be modified or performed differently than the specific example provided. As an example, the method 300 is described as being performed by the autonomous driving subsystem 104. However, it should be understood that in some embodiments, portions of the method 300 may be performed by an electronic controller (for example, the electronic controller 200 and the electronic processor 205) or other devices or subsystems of the system 100.

At block 302, the autonomous driving subsystem 104 receives sensor information from one or more sensors of the vehicle. For example, the autonomous driving subsystem 104 may receive range finding and image data from the sensors 114 via the bus 116.

At block 304, the autonomous driving subsystem 104 generates, based on the sensor information, a model of the environment surrounding the vehicle. For example, the autonomous driving subsystem 104 may use LIDAR data to construct a three-dimensional model of the objects in the environment. In some embodiments, the model is a mathematical model that includes locations, velocities, and trajectories for the objects in the environment. In some embodiments, the model is continuously updated as new sensor data is retrieved.

At block 306, the autonomous driving subsystem 104 determines, based on the model of the environment surrounding the vehicle, a plurality of possible trajectories for the vehicle. For example, the autonomous driving subsystem 104 may determine that the vehicle could either proceed more slowly in its current lane, or make a lane change and maintain a higher speed.

At block 308, the autonomous driving subsystem 104 selects, from the plurality of possible trajectories, a travel path for the vehicle. For example, the autonomous driving subsystem 104 may choose, based on the surrounding traffic, a destination, and an estimated travel time, to make a lane change. In another example, the autonomous driving subsystem 104 senses a curve in the road ahead and selects a trajectory that will allow the vehicle to negotiate the curve with the least discomfort to any human passengers. In some embodiments, the autonomous driving subsystem 104 determines possible trajectories for the vehicle based on the model of the environment surrounding the vehicle, a current vehicle travel path, and emergency braking commands received from the collision mitigation system.

Regardless of how the vehicle path is determined, at block 310, the autonomous driving subsystem 104 transmits the travel path to the collision mitigation subsystem. For example, the autonomous driving subsystem 104 may send the actuation commands that control steering, acceleration, braking, and the like to both vehicle control systems and the collision mitigation subsystem 106. In another example, the autonomous driving subsystem 104 transmits the travel path to the collision mitigation subsystem 106 by writing the travel path to the shared memory accessible by both subsystems.

Figure 4:
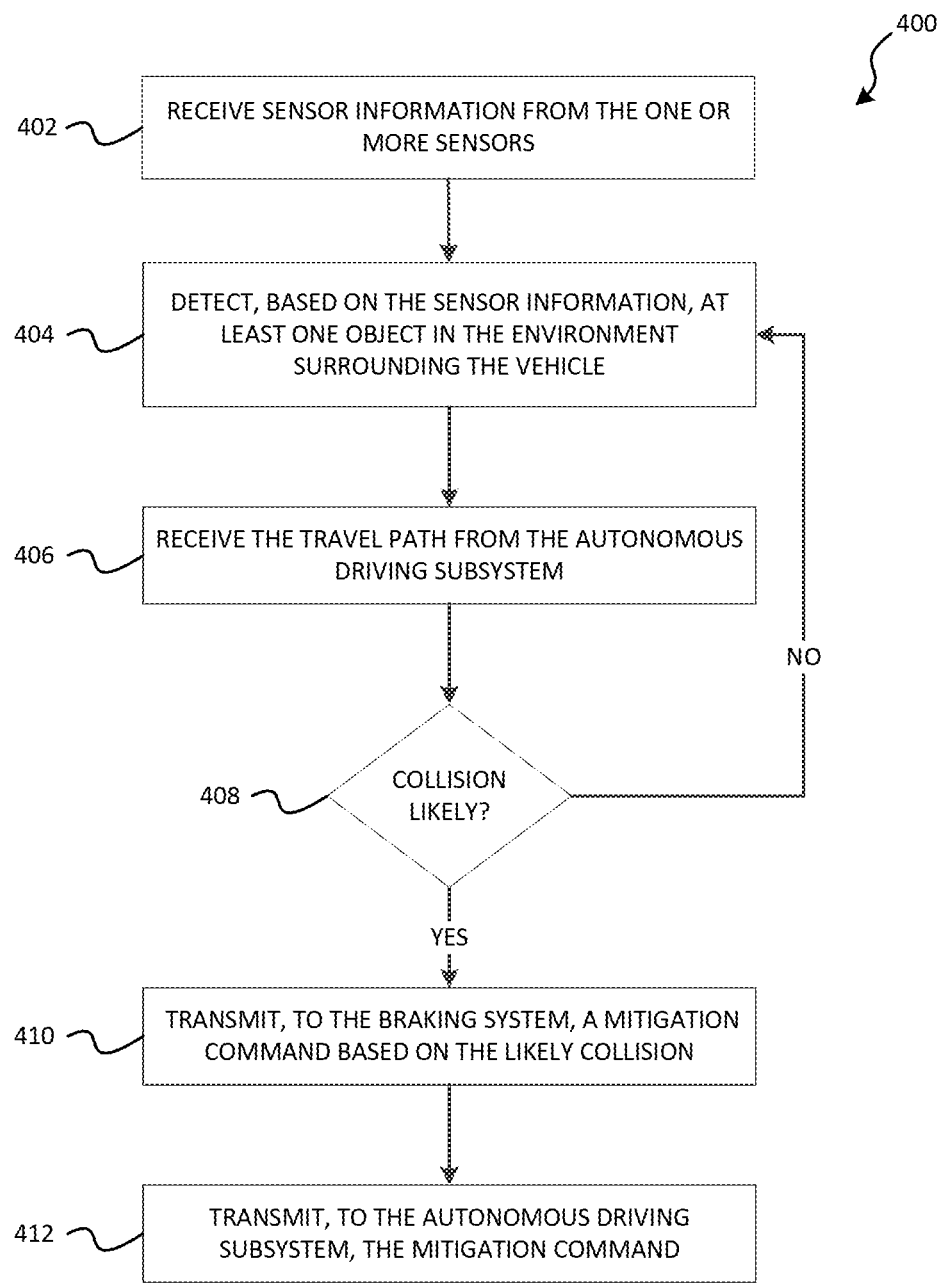
FIG. 4 is a flow chart of a method performed by the system of FIG. 1 to control a vehicle, in accordance with some embodiments.

FIG. 4 illustrates an example method 400 for controlling a vehicle by operating a collision mitigation system in concert with an autonomous driving system to provide reduced reaction latency and increased redundancy to the vehicle's operation. Although the method 400 is described in conjunction with the system 100 as described herein, the method 400 could be used with other systems and vehicles. In addition, the method 400 may be modified or performed differently than the specific example provided. As an example, the method 400 is described as being performed by the collision mitigation subsystem 106. However, it should be understood that in some embodiments, portions of the method 400 may be performed by an electronic controller (for example, the electronic controller 200 and the electronic processor 205) or other devices or subsystems of the system 100.

At block 402, the collision mitigation subsystem 106 receives the sensor information one or more sensors of the vehicle. For example, the collision mitigation subsystem 106 may receive range finding and image data from the sensors 114 via the bus 116.

At block 402, the collision mitigation subsystem 106 detects, based on the sensor information, at least one object in the environment surrounding the vehicle. For example, the collision mitigation subsystem 106 may detect another vehicle approaching the vehicle 102, a traffic sign, a stationary vehicle, and the like.

At block 404, the collision mitigation subsystem 106, rather than attempting to predict a trajectory for the vehicle, receives the travel path from the autonomous driving subsystem 104. The travel path is determined as described above with respect to the method 300. In some embodiments, the travel path includes the vehicle's future positions, velocities, accelerations, and yaw rates that combine to describe where and how quickly the vehicle is moving in the near future.

At block 406, the collision mitigation subsystem 106 determines, based on a characteristic of the at least one object and the travel path, whether a collision between the vehicle and the object is likely (an imminent collision). For example, when the directions and velocities of the vehicle and the object indicate that the two will occupy the same location unless evasive action is taken within a time threshold, then a collision is imminent. In some embodiments, the time threshold is set based on a reaction latency of the autonomous driving subsystem 104. When no imminent collision is detected, the collision mitigation subsystem 106 continues analyzing sensor inputs for potential collisions (at blocks 404-408).

At block 410, in response to determining the likely collision, the collision mitigation subsystem 106 transmits, to the braking system, a mitigation command based on the likely collision. In some embodiments, the mitigation command is one of a brake prefill command, a partial braking command, and an emergency braking command. In some embodiments, the mitigation command may include an evasive steering command or an alert (for example, to warn a driver of the vehicle of the imminent collision).

At block 412, responsive to determining the likely collision, the collision mitigation subsystem 106 transmits, to the autonomous driving subsystem 104, the mitigation command.

Thus, the invention provides, among other things, a control system for an autonomous vehicle. Various features and advantages of the invention are set forth in the following claims.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Various features, advantages, and embodiments are set forth in the following claims.

What is claimed is:

1. A system for controlling a vehicle, the system comprising:
   one or more sensors positioned on the vehicle and configured to sense an environment surrounding the vehicle;
   a collision mitigation subsystem configured to control a braking system of the vehicle;
   an autonomous driving subsystem communicatively coupled to the one or more sensors and the collision mitigation subsystem, the autonomous driving subsystem including a first electronic processor configured to
   receive sensor information from the one or more sensors;
   generate, based on the sensor information, a model of the environment surrounding the vehicle;
   determine, based on the model of the environment surrounding the vehicle, a plurality of possible trajectories for the vehicle;
   select, from the plurality of possible trajectories, a travel path for the vehicle;
   transmit the travel path to the collision mitigation subsystem; and
   steer the vehicle according to the travel path.

2. The system of claim 1, wherein the collision mitigation subsystem includes a second electronic processor configured to:
   receive the sensor information from the one or more sensors;
   detect, based on the sensor information, at least one object in the environment surrounding the vehicle;
   receive the travel path from the autonomous driving subsystem;
   determine, based on a characteristic of the at least one object and the travel path, a likely collision between the vehicle and the object;
   in response to determining the likely collision, transmit, to the braking system, a mitigation command based on the likely collision; and
   transmit, to the autonomous driving subsystem, the mitigation command.

3. The system of claim 2, wherein the mitigation command is one selected from the group consisting of a brake prefill command, a partial braking command, and an emergency braking command.

4. The system of claim 2, wherein the first electronic processor of the autonomous driving subsystem is further configured to, when the mitigation command is an emergency braking command:
   receive the emergency braking command from the collision mitigation subsystem;
   control a steering system of the vehicle to cause the vehicle to follow the travel path; and
   determine a second plurality of possible trajectories for the vehicle based on the model of the environment surrounding the vehicle, the travel path, and the emergency braking command.

5. The system of claim 1, further comprising:
   a shared memory;
   wherein the first electronic processor of the autonomous driving subsystem and the second electronic processor of the collision mitigation subsystem are communicatively coupled to the shared memory; and
   the autonomous driving subsystem is configured to transmit the travel path to the collision mitigation subsystem by writing the travel path to the shared memory.

6. The system of claim 1, wherein a latency for the autonomous driving subsystem is greater than a latency for the collision mitigation subsystem.

7. The system of claim 1, wherein the autonomous driving subsystem and the collision mitigation subsystem are communicatively coupled by at least one selected from the group consisting of a Controller Area Network bus, and an automotive Ethernet.

8. A method for controlling a vehicle, the method comprising:
   receiving sensor information from one or more sensors positioned on the vehicle and configured to sense an environment surrounding the vehicle;
   generating, with a first electronic processor of an autonomous driving subsystem communicatively coupled to the one or more sensors and based on the sensor information, a model of the environment surrounding the vehicle;
   determining, with the autonomous driving subsystem and based on the model of the environment surrounding the vehicle, a plurality of possible trajectories for the vehicle;
   selecting, from the plurality of possible trajectories, a travel path for the vehicle;
   transmitting the travel path to a collision mitigation subsystem configured to control a braking system of the vehicle; and
   steering the vehicle according to the travel path.

9. The method of claim 8, further comprising:
   detecting, based on the sensor information, at least one object in the environment surrounding the vehicle;
   determining, based on a characteristic of the at least one object and the travel path from the autonomous driving subsystem, a likely collision between the vehicle and the object;
   in response to determining the likely collision, transmitting, to the braking system, a mitigation command based on the likely collision; and
   transmitting the mitigation command to the autonomous driving subsystem.

10. The method of claim 9, wherein transmitting the mitigation command includes transmitting one selected from the group consisting of a brake prefill command, a partial braking command, and an emergency braking command.

11. The method of claim 9, further comprising:
    when the mitigation command is an emergency braking command:
    controlling a steering system of the vehicle to cause the vehicle to follow the travel path; and
    determining a second plurality of possible trajectories for the vehicle based on the model of the environment surrounding the vehicle, the travel path, and the emergency braking command.

12. The method of claim 8, wherein transmitting the travel path to the collision mitigation subsystem includes writing the travel path to a shared memory coupled the first electronic processor of the autonomous driving subsystem and a second electronic processor of the collision mitigation subsystem.

13. The method of claim 8, wherein a latency for the autonomous driving subsystem is greater than a latency for the collision mitigation subsystem.

14. The method of claim 8, wherein transmitting the travel path to the collision mitigation subsystem includes transmitting the travel path via at least one selected from the group consisting of a Controller Area Network bus, and an automotive Ethernet.

15. A vehicle comprising:
one or more sensors positioned on the vehicle and configured to sense an environment surrounding the vehicle;
a collision mitigation subsystem;
an autonomous driving subsystem communicatively coupled to the one or more sensors and the collision mitigation subsystem and configured to
receive sensor information from the one or more sensors;
generate, based on the sensor information, a model of the environment surrounding the vehicle;
determine, based on the model of the environment surrounding the vehicle, a plurality of possible trajectories for the vehicle;
select, from the plurality of possible trajectories, a travel path for the vehicle; and
transmit the travel path to the collision mitigation subsystem;
wherein the collision mitigation subsystem is configured to
receive the sensor information from the one or more sensors;
detect, based on the sensor information, at least one object in the environment surrounding the vehicle;
receive the travel path from the autonomous driving subsystem;
determine, based on a characteristic of the at least one object and the travel path, a likely collision between the vehicle and the object;
in response to determining the likely collision, transmit, to a braking system of the vehicle, a mitigation command based on the likely collision;
transmit, to the autonomous driving subsystem, the mitigation command; and
steer the vehicle according to the travel path.

16. The vehicle of claim 15, wherein the mitigation command is one selected from the group consisting of a brake prefill command, a partial braking command, and an emergency braking command.

17. The vehicle of claim 15, wherein the autonomous driving subsystem is further configured to, when the mitigation command is an emergency braking command:
receive the emergency braking command from the collision mitigation subsystem;
control a steering system of the vehicle to cause the vehicle to follow the travel path; and
determine a second plurality of possible trajectories for the vehicle based on the model of the environment surrounding the vehicle, the travel path, and the emergency braking command.

18. The vehicle of claim 15, further comprising:
a shared memory;
wherein the autonomous driving subsystem and the collision mitigation subsystem operate on one or more electronic processors communicatively coupled to the shared memory; and
the autonomous driving subsystem is configured to transmit the travel path to the collision mitigation subsystem by writing the travel path to the shared memory.

19. The vehicle of claim 15, wherein a latency for the autonomous driving subsystem is greater than a latency for the collision mitigation subsystem.

20. The vehicle of claim 15, wherein the autonomous driving subsystem and the collision mitigation subsystem are communicatively coupled by at least one selected from the group consisting of a Controller Area Network bus, and an automotive Ethernet.

* * * * *